WILLIAM M. DAVIS.
Improvement in Ornamental Mirrors, &c.

No. 125,726.  Patented April 16, 1872.

Witnesses:
Rollin Germain
H. W. Jones

Inventor:
William M. Davis 125,726

UNITED STATES PATENT OFFICE.

WILLIAM M. DAVIS, OF BROOK HAVEN, ASSIGNOR TO HIMSELF AND SIDNEY S. NORTON, OF BROOKLYN, NEW YORK.

IMPROVEMENT IN ORNAMENTAL MIRRORS, &c.

Specification forming part of Letters Patent No. 125,726, dated April 16, 1872.

I, WILLIAM M. DAVIS, of the town of Brook Haven, in the county of Suffolk and State of New York, have invented a new and useful Improvement in Ornamental Mirrors, of which the following is a description:

My invention relates to a lettered or ornamented, or a lettered and ornamented, looking-glass or mirror of commerce; and consists of such a mirror having the coating or deposit upon its surface removed in an ornamental pattern, so as to expose within the limits of said design the transparent glass, which portion of the mirror is backed up, filled, or covered with a photograph or other picture, paint, or figment of any color, or any other material which affords a distinguishing or contrasting appearance with the intact mirrored portion.

Figure 2:
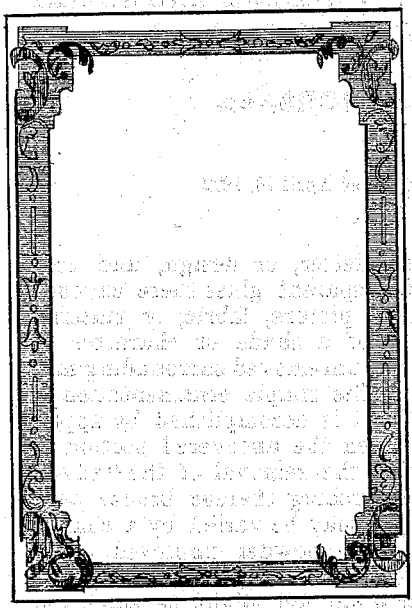
Figure 1:
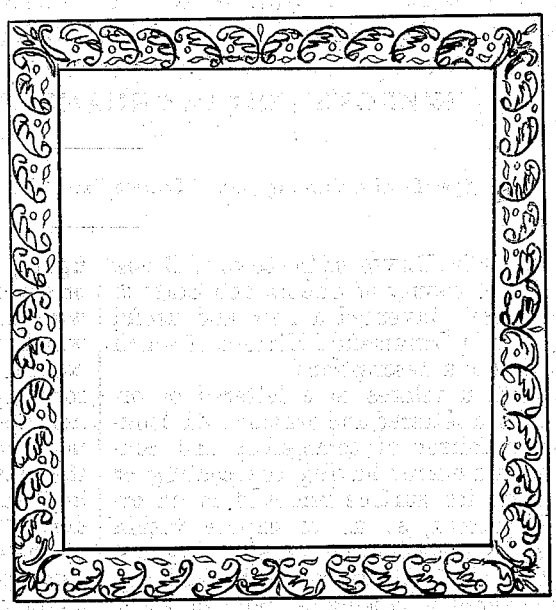
Figure 4:
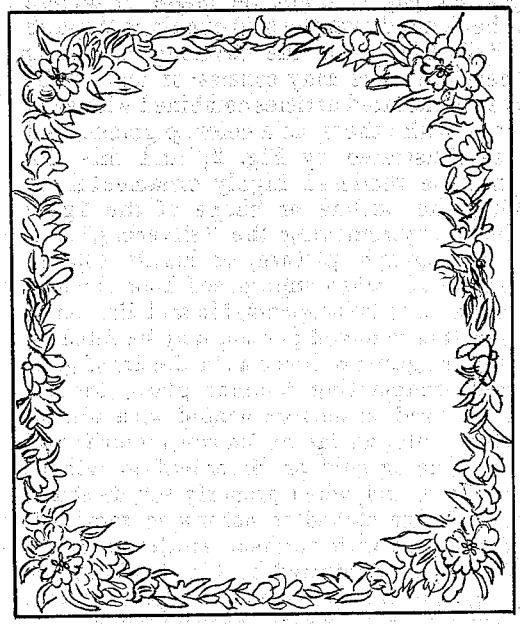
Figure 3:
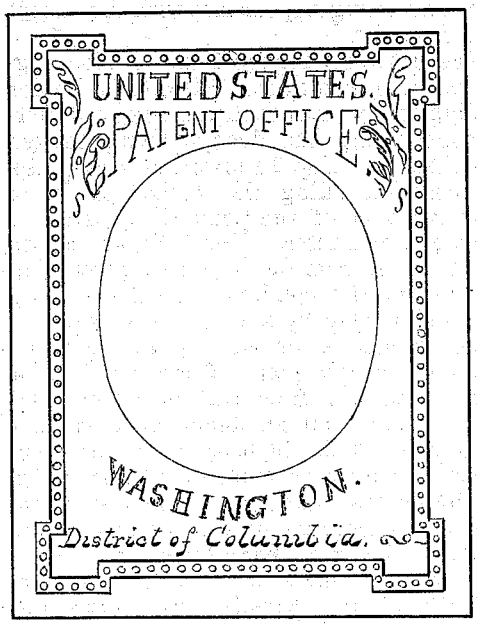

In the drawing, Figure 1 shows a looking-glass or mirror ornamented with a border according to my invention, the removed portion, constituting the design, being backed up with bronze. Fig. 2 shows a looking-glass, the decoration filling the design produced by the removal of the "silvering" being of a compound character. Fig. 3 shows the application to mirrors of advertising lettering and ornamentation combined. Fig. 4 shows a mirror ornamented by a wreath of flowers.

Looking-glasses or mirrors are made by depositing upon a plate of glass a film or stratum produced from salt of silver, platinum, or mercurial amalgam in a manner well known. This deposit or coating constitutes the mirror or reflector, and is designated herein as "silvering," which word includes the reflecting-coating produced from any of the materials hereinbefore recited, or any of their products or chemical combinations. This mirror constitutes a known and common article of commerce, readily distinguishable from a mirror produced by polished metals, polished glass, or other mere reflecting-surfaces.

In carrying out my invention I take a mirror or plate of "silvered" glass, and remove the "silvering" from it by means of a suitable pointed tool or chisel, operated by hand or by mechanical agency, in an ornamental figure, pattern, letter, or design, and coat or cover the transparent glass there exposed with a pigment, picture, fabric, or material which shall be of a shade or character to contrast with the unremoved surrounding mirrored portion. The simple ornamentation illustrated in Fig. 1 is accomplished by applying a varnish upon the uncovered portion of the glass left by the removal of the "silvering" and then brushing thereon bronze powder. This style may be varied by a change of the color of the powder employed, or by using powdered mother-of-pearl, whiting, &c.; or tin, zinc, or other foil might be employed as the backing; or any kind or color of pigment or materials, such as mottled, marbled, or pearled paper, might be made to adhere to or be secured over the said openings through the "silvering;" or the covering or filling of these openings may consist of any of the above-enumerated articles combined with each other or with others, as a color, pigment, and bronze, illustrated by Fig. 2; and this filling may be rendered highly ornamental by making the outline or shape of the figure produced, by removing the "silvering," that of a photograph, picture, or highly-colored design, which, when superposed upon the mirror, appears to be suspended in mid-air. And, further, this removed portion may be filled by a letter or figure produced as in the art of gilding and ornamenting common glass, (though it can be used on mirrors coated with nitrate of silver only, as far as known,) which consists in causing gold or silver leaf to adhere to the glass, and, when properly set, its shade lines or design etched or otherwise removed, to be filled in with pigment, mother-of-pearl, or powder, as illustrated by Fig. 4, where the varying shades of pigment are applied in this manner, which is rapidly accomplished by a machine patented to me October 18, 1870.

It will be understood that I am not limited to any design or shape of figure produced by removing the silvering, nor to any particular kind of backing, but to the looking-glass or mirror of commerce when improved and rendered useful, not only as a mirror, but as an advertising medium or ornamental device.

It is obvious that I may decorate in like manner convex or concave surfaced mirrors.

I am aware that signs have been made by etching the letters or ornamentation into the surface of glass, and then covering said surface with common mercurial amalgam, and I do not, therefore, claim a sign made by my process which cannot be easily distinguished from such signs; but—

What I do claim, and desire to secure by Letters Patent, is—

As a new article of manufacture, a mirror consisting of a plate of glass having upon its posterior surface a deposit or coating from salts of silver or platinum, or a mercurial amalgam, said coating removed to form a design or figure, and covered with a contrasting backing.

WILLIAM M. DAVIS.

Witnesses:
ROLLIN GARMAIN,
K. N. JONES.